United States Patent

Swale et al.

[11] Patent Number: 5,822,411
[45] Date of Patent: Oct. 13, 1998

[54] TELECOMMUNICATIONS CHARGING

[75] Inventors: Richard P. Swale, Ipswich; John R. Anderson, Dedham, both of Great Britain

[73] Assignee: British Telecommunications public limited company, London, England

[21] Appl. No.: 765,736
[22] PCT Filed: Jul. 14, 1995
[86] PCT No.: PCT/GB95/01669
§ 371 Date: Jan. 30, 1997
§ 102(e) Date: Jan. 30, 1997
[87] PCT Pub. No.: WO96/03000
PCT Pub. Date: Feb. 1, 1996

[30] Foreign Application Priority Data

Jul. 14, 1994 [EP] European Pat. Off. .............. 94305167

[51] Int. Cl.⁶ .................................................. H04M 15/00
[52] U.S. Cl. .......................... 379/111; 379/114; 379/121; 379/144
[58] Field of Search .................................... 379/111, 112, 379/114, 115, 119, 120, 121, 126, 127, 130, 201, 140, 143, 144, 88

[56] References Cited

U.S. PATENT DOCUMENTS

| 5,003,584 | 3/1991 | Benyacar et al. | 379/119 |
| 5,148,474 | 9/1992 | Haralambopoulos et al. | 379/120 |
| 5,381,467 | 1/1995 | Rosinski et al. | 379/121 |
| 5,602,907 | 2/1997 | Hata et al. | 379/114 |
| 5,646,984 | 7/1997 | Oda | 379/114 |
| 5,754,633 | 5/1998 | Levy | 379/114 |

FOREIGN PATENT DOCUMENTS

A 0491497 6/1992 European Pat. Off. .
A 91 16779 10/1991 WIPO .

OTHER PUBLICATIONS

Reinig et al, "Intelligent Networking Inpacts on Account Management", GLOBECOM '92—IEEE Global Telecommunications Conference, vol. 2/3, Dec. 1992, Orlando, Florida, pp. 1022–1026, XP 000357711.

Primary Examiner—Curtis A. Kuntz
Assistant Examiner—Binh K. Tieu
Attorney, Agent, or Firm—Nixon & Vanderhye P.C.

[57] ABSTRACT

During a telephone or other connection an exchange stores information about charges to be made for that connection. To provide flexible charging the exchange responds to a charge variation request signal to transmit to a party by whom a proposed charge is to be borne a signal requiring acknowledgement and to modify a respective portion of the store contents relating to said connection in progress only if such an acknowledgement is received, so as to vary the charging arrangements, for example to invoke a higher rate of charge, or alternatively to change the party by whom charges are to be borne.

14 Claims, 4 Drawing Sheets ent invention relates to telecommunications services and apparatus, and more especially to arrangements for charging for telecommunications services. It is applicable both to telephony based services and to others such as broadband services.

TELECOMMUNICATIONS CHARGING

TECHNICAL FIELD

The present invention relates to telecommunications services and apparatus, and more especially to arrangements for charging for telecommunications services. It is applicable both to telephony based services and to others such as broadband services.

DESCRIPTION OF PRIOR ART

Telephone calls and other telecommunications links tend to be charged on a time of day/duration/distance basis where the fee levied is dependent upon the time of day the call is made, the duration of the call and the distance between the parties involved in the call. A number of telephony services are now available which make use of variations to this basic theme through a variety of means. These include called party charging, split called/calling party charging or premium rate charging (where an additional fee is charged on top of the basic "normal" call charge and credited to the called party). Use of these mechanisms has enabled the creation of a number of services both in the UK and elsewhere.

However, the arrangements employed hitherto lack flexibility. For example, premium rate calls employ the same pence per minute rate throughout the duration of calls. This means that one can find operators of recorded information services artificially increasing the duration of a call (by giving the information out more slowly than is necessary) in order to recoup the charge they consider appropriate for a particular piece of information. This means that the service operator needs more equipment and lines and of course it is wasteful of his customers' time.

US Pat. No. 5,148,474 discloses a method of conducting a business wherein a party calls for a service or product, and after identification, requests a service or product from the called provider who establishes a rate for compliance. The caller responds by making or completing a conference call (also known as three-way calling) to a designated number, which responds by activating an announcement system and playing a brief warning message stating the rate that the caller is being charged. The provider hears this message and uses it as confirmation that the caller has dialled the requested number to establish a three-way conference call. The announcement system now remains silent, and the only function of the third line of the conference call is to provide automatic billing for the time during which the services are provided. In other words, the agreed charge is made to the caller by means of a separate billing the conference call, and the provider receives the charge by subsequent transfer of funds from the network operator. The provider has to replicate this arrangement for each different charge rate.

European Patent Application No. 9131123888.9 (Publication No. 0 491 497) discloses a call billing method which enables a service provider (also known as a sponsor) to specify call billing information to the network on a call-by-call basis. A caller dials a published number for a service provider, and this is received by an action control point (ACP) which interrogates a network control point data base to convert this to a routing number which is then forwarded to a terminating toll switch for completion of the call to the provider. When the provider answers the call the action control point starts timing the call.

As part of the call setup procedure, the terminating toll switch sends to the provider a signalling message including the caller's identification. Following a successful credit check, the provider outputs a menu of available services and the caller makes a selection by, e.g. touch tone entry at the caller's telephone. After receiving the caller's response, the provider selects appropriate billing parameters for the call, and supplies the caller with the requested service.

Before terminating the call, the provider sends a signalling message (Sponsor Specified Caller Rate Information) to the terminating toll switch containing call identification information, timing information and rating information, and the terminating toll switch, in turn, sends a signalling message to the action control point (functioning as a billing recording toll switch) which adds an additional set of parameters (ACP Specified Information, i.e. time of call, elapsed time, caller entered digits, and call disposition information) to the message to create an automatic message accounting (AMA) billing record which it then sends to a billing system. In this arrangement the ACP receives the charging information from the sponsor only after the service has been delivered to the caller.

SUMMARY OF THE INVENTION

According to the present invention there is provided a telecommunications exchange including a store for storing records containing information as to the cost of connections control means responsive to a connection being established between a calling party and a called party to create in the store a respective record containing charge information for the connection, and responsive, during the connection of said parties, to receipt of a charge variation request signal from one of said parties, to
  (a) transmit to whichever of said parties is to bear a proposed charge a signal requiring acknowledgement
  (b) modify the respective record upon receipt of such an acknowledgement.

In another aspect the invention provides a telecommunications network including a store for storing records containing Information as to the cost of connections control means responsive to a connection being established between a calling party and a called party to create in the store a respective record containing charge information for the connection, and responsive, during the connection of said parties, to receipt of a charge variation request signal from one of said parties, to
  (a) transmit to whichever of said parties is to bear a proposed charge a signal requiring acknowledgement
  (b) modify the respective record upon receipt of such an acknowledgement.

In a further aspect, the invention provides a method of operating telecommunication network including the steps of:
  (a) making a connection between a first and a second party;
  (b) creating a respective record containing information as to the charge to be made for the connection;
  (c) receiving, during said connection, a charge variation request signal from one of said parties: and in response
  (d) transmitting, to whichever of said parties is to be bear a proposed charge, a signal requiring acknowledgement; and
  (e) modifying said respective record upon receipt of such an acknowledgement.

It will be seen that the invention allows the charging of a call to be varied as it progresses, the original call derail record being modified upon receipt of the permission of the party who will bear the charge. For example the called party might request the network operator to vary the charging applied to a received call, whilst it is in progress. Charge variation requests may be issued under a number of circumstances: for example i) to increase/decrease the charge of the call for the rest of the call duration or until subsequently modified, ii) to generate a "one-off" charge/credit against the caller or iii) temporarily increase/decrease the cost of the call for a specific period of time.

This mechanism may also be applied in the reverse direction as a means whereby the caller may raise charges against the called party.

In order that unscrupulous operators do not mis-use this mechanism, the invention makes provision for the party to whom the charges for the call are to be debited to be automatically alerted by the network prior to the charge variation being invoked. The "charged" party may then have the option to refuse the variation should they so desire. In this case the call will not automatically clear, rather the party requesting charge variation will be informed. The charged party may also hang-up at any point in the call, in which case they will automatically refuse any charge variance negotiation currently taking place.

This feature (Charge Variation Request) may be invoked by a number of routes. One possibility, for a normal analogue line, would be for the initiator to invoke a register recall function followed by dialling a special code. Appropriate voice prompts would be played to the distant party during this time to advise them of what was going on and to request acceptance or rejection of the requested charge variation. This they could do by dialling a reply e.g. 1 for accept and 3 for reject. Having received the necessary information, the exchange originating the request would then advise the initiator of the result of the request via a recorded voice message and modify the charging information accordingly. This modification will generally require a signalling message to be transferred to the distant exchange in order that it can modify,its charging rate.

BRIEF DESCRIPTION OF THE DRAWINGS

Some embodiments of the invention will now be described with reference to the accompanying drawings, in which.

DETAILED DESCRIPTION OF PREFERRED EMBODIMENTS

Figure 1:
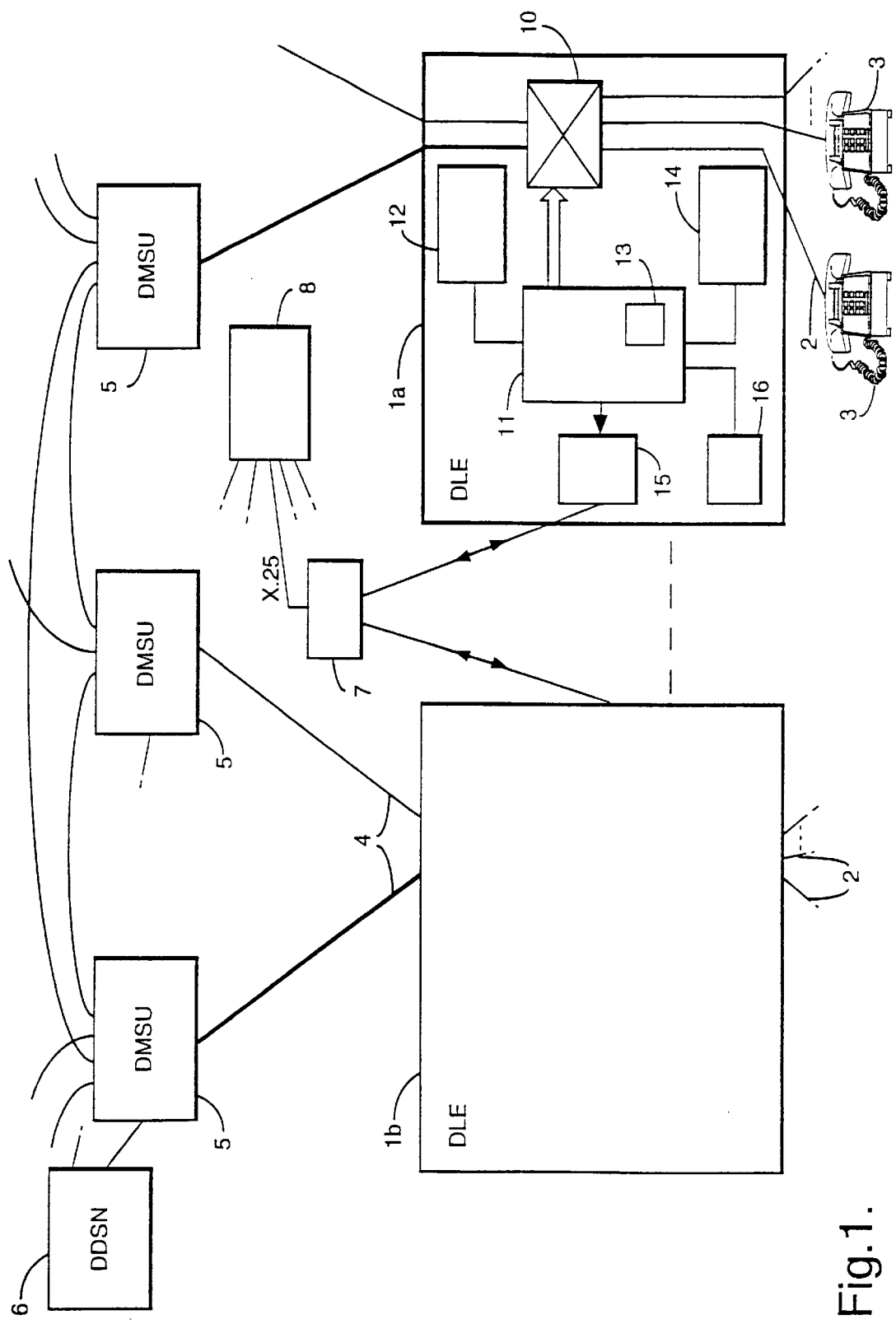
FIG. 1 is a block diagram of a telecommunications network.

FIG. 1 shows a telephone network which has a large number of digital local exchanges only two of which 1a, 1b are shown. Each exchange is connected via concentrators (not shown and local analogue lines 2 to subscriber terminations illustrated as telephones 3. Each local exchange is also connected via high-speed digital links 4 to two (but optionally one) of a relatively smaller number of digital main switching units (DMSU) 5 which together form a trunk network with each DMSU 5 being connected to every other one.

FIG. 1 also shows the construction of the digital local exchange. Calls re routed by a cross-point switch 10 under stored-program control by a central processing unit (CPU) 11. Telephone calls from a subscriber termination 3 to another such termination on the same local exchange are routed directly by the CPU 11 and switch 10 whilst other calls are routed to the DMSU 5 and thence via the trunk network to a destination termination. The CPU 11 is able to distinguish between local numbers and trunk numbers by means of a routing table store 12 containing stored information indicating which number prefixes are allocated to trunk calls and which to local.

The DMSUs 5 may also be linked to other networks for providing additional services, for example a digital derived services network 6 for which provides routing of calls using a numbering system which, because it is unrelated to the topological location of the relevant lines, requires number translation. Such services may also carry differing charge rates, for example (in the UK) "free" (0800) calls (which are charged to the called party) and premium rate (0891) calls.

Charging for calls is performed by the CPU 11 in the local exchange, though there is no reason why the local exchange could not be provided with a separate processing unit to perform this or other tasks ancillary to the main task of routing calls. In this description it is assumed that all charging is performed by the local exchange, though there is no reason why the higher order exchanges could not provide charging facilities, in lieu of the local exchange, for calls which they handle.

The way this works is as follows. At the commencement of a call, the CPU 11 of the local exchange of the subscriber originating the call records destination information - either the fact that it is a local call, or the dialling code prefix of a non-local call.

When the connection is made, the local exchange receives (internally, or from the local exchange of the called subscriber) a "call connected" signal indicating that the latter has answered, and the call commences. At this point a Call Detail Record is set up in an assigned storage area 13 of the CPU 11, with the information set out below; except of course the stop time and duration. These are computed by the CPU at the end of the call and added to the detail record. The charge band information is obtained by reference to a store 14 containing information as to the charging rates according to destination, time of day, day of the week etc. The information contained in the Call Detail Record typically includes the following:

Date of call
Number of calling subscriber
Number called
Time of starting of call
Time of ending of call
Duration of call
Charge band code.

although not all of this information is strictly necessary.

Upon the termination of the call, the information in the Call Detail Record(s) is transferred to a billing data store 15 in the local exchange 1. This information is transferred on a daily basis to a district data collection centre 7 and hence to a Billing centre 8 where the data may be further processed and bills distributed.

If charging rates change at a certain time of day—perhaps calls are cheaper after 6pm—then this can be accommodated by the Billing Centre 8. If for example a call is in progress at 6pm and the relevant Call Detail Record contains an indication that shows that the call is to be charged in charge band a; the Billing centre will contain stored charging tables giving the pence per minute rates for charge band a and calculate the correct charge accordingly.

The charging process as so far described is entirely conventional. The variations now to be described have as their object permitting the changing of the charge arrangements during the course of a call.

Possible facilities are:
1. The charge is made to the called party instead of the calling party;
2. The charge rate is increased (or decreased) for the remainder of the call (or until a further such change is made);
3. A one-off charge is made in addition to the normal call charge.
4. The charge rate is changed for a fixed period of time or until the end of the call, whichever is earlier (this could be achieved by two requests as under (2) above, but has the advantage that the party bearing the charge knows in advance the cost that he is agreeing to);

It is envisaged that each of these will be implemented by:
(a) One party requesting the change;
(b) The other party agreeing to the change;
(c) The change being implemented.

though it may well be considered satisfactory for charge reductions to be implemented without the agreement of the party being charged.

Similarly, if the person requesting a charge or charge increase is the party against whose account the charge in question is to be made, then the acknowledgement procedure may if desired be dispensed with.

Figure 2:
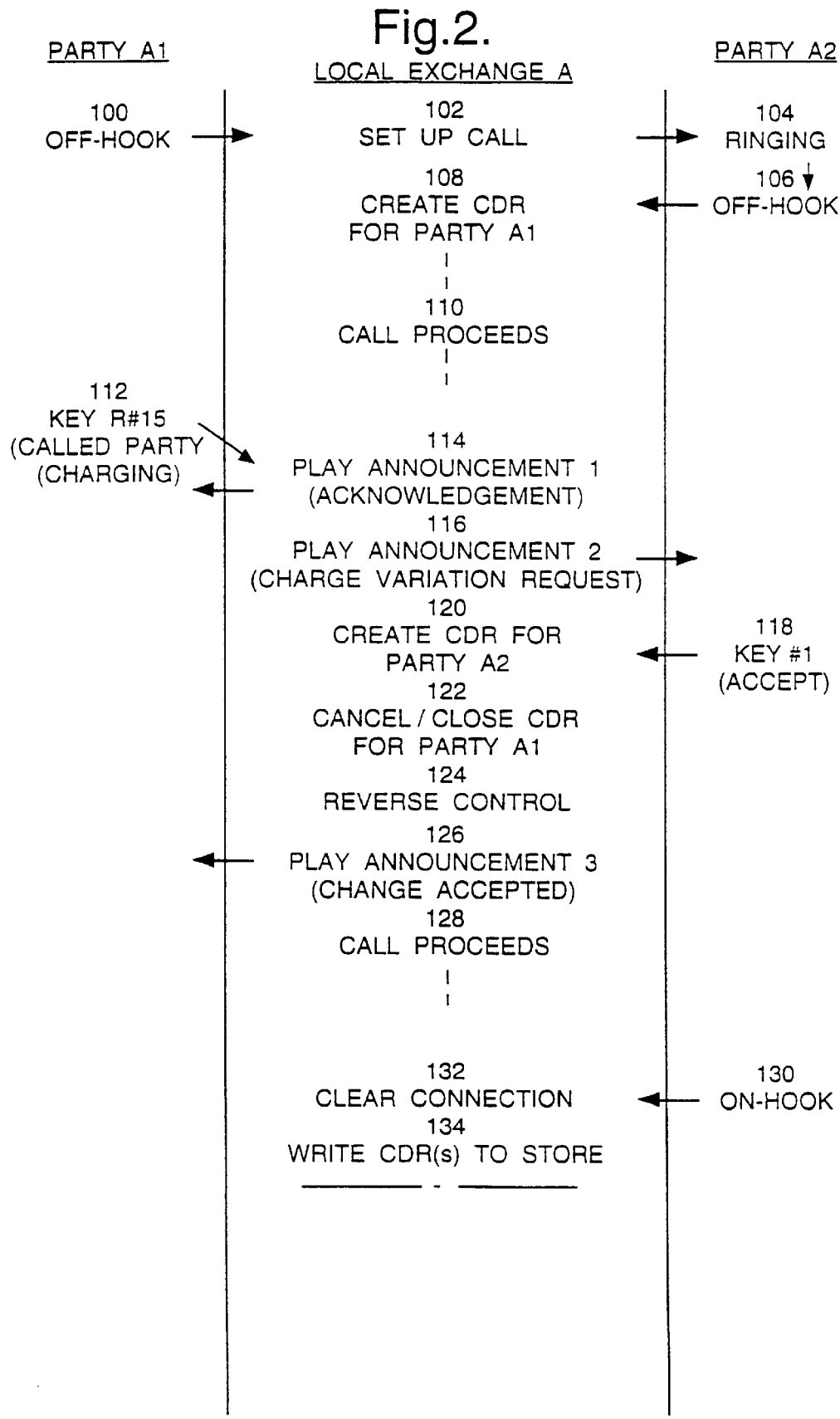
FIGS. 2 to 4 are flowcharts indicating the operation of preferred embodiments of the invention.

FIG. 2 is a flowchart illustrating the processes that take place, in the case of a local call, in the CPU of the local exchange 1a handling the call, in the event that a party A1 makes a call to party A2, and then requests that the cost of the call be charged to party A2.

First, party A1 goes off-hook (100) and the exchange responds by setting up the call (102) and sends a ringing signal to party A2 (104). When party A2 goes off-hook (106), this is signalled to the exchange and the connection of the call is complete. The exchange 1a creates (108) a Call Detail Record in its store 13, with the numbers of party A1 and A2 recorded as the calling and called numbers respectively.

Thus far, the process is conventional. The call proceeds (110). Suppose now that party A1 wishes the cost of call to be charged to party A2. Any desired form of signal may be employed: currently in the UK, existing services (such as three-way calling) available during the course of a call are set up using the recall signal (a single loop-disconnect signal) followed by a number of digits dialled using multi-frequency tone dialling, and for this example the code R#15 is assumed. Thus party A1 dials R#15 (112). The local exchange CPU 11 responds by:

(a) playing (114) a voice announcement to party A1—for example using a recorded message unit 16—e.g. "Your request for charge transfer is being processed";
(b) playing (116) a voice announcement to party A2 requesting permission to make the change, e.g. "The calling party has requested that you are charged for this call. The rate is 15 p per minute. Please key '1' to accept or '2' to refuse."

If party A2 keys '2' to send a multifrequency signal back to the exchange, no further action is taken (other than perhaps announcing the refusal to party A1); if however he keys '1' this is recognised by the exchange which responds by:

(a) creating (120) a new Call Detail Record identical to the previous one but with the called and calling numbers transposed (b) erasing (122) the original Call Detail Record. Alternatively, if the system is set up so that party A2 becomes responsible only for those call charges incurred after the changeover, then the original Record can be closed, inserting the current time as the finish time (and of course as the start time on the new Call Detail Record).
(c) Assuming that the normal network configuration is 'calling party clear'—i.e. the call clears down immediately only when the calling party goes on hook so that the party paying for the call controls when it ends—then this may be reversed (124) to give control to party A2.
(d) Playing (126) a further voice announcement to party A1 confirming that the change has occurred, e.g. "The other party is now paying for the call." The call then proceeds normally (128), and assuming control reversal has taken place is terminated by party A2 going on-hook (130) whereupon the exchange clears the connection (132) and writes (134) the Call Detail Record(s) to the store in the usual way.

Figure 3:
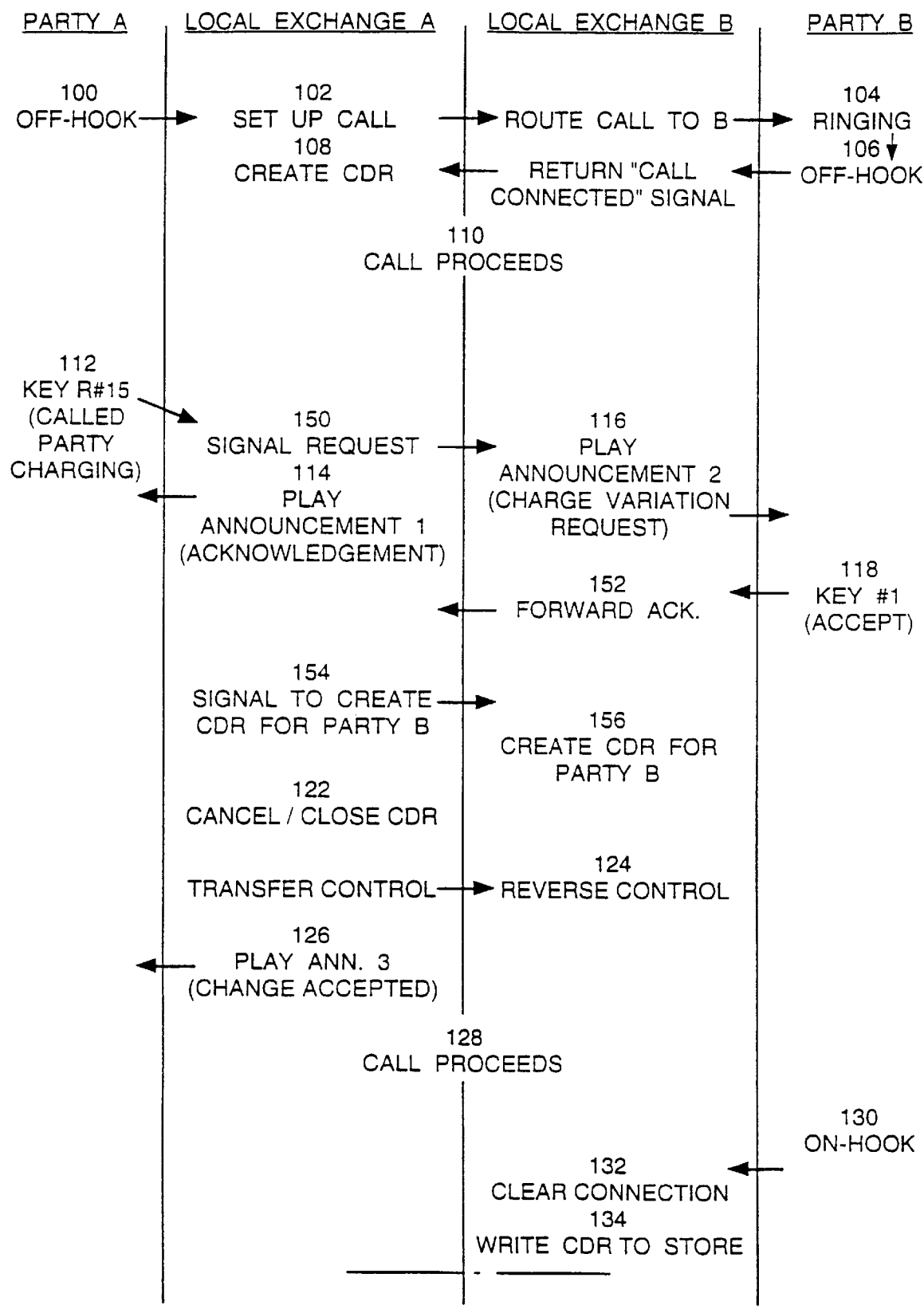

FIG. 3 shows the same process, but where the two parties A, B are connected to different local exchanges A, B. Steps equivalent to those in FIG. 2 are given the same reference numerals. The process differs in that:

Step 150: the charge reversal request is forwarded by exchange A to exchange B.

Step 152: the accept signal is forwarded by exchange B to exchange A.

Step 154, 156: exchange A responds to the acceptance by instructing exchange B to set up its own Call Detail Record for the call, naming party B as the calling party: this signal will contain the necessary number, charge band and timing details as exchange B will not previously have recorded such information. Exchange B then reacts by creating the Call Detail Record in its own store 13. (Alternatively, if the network is set up to permit an exchange to create charges for other exchanges, exchange A could set up the new record, as in the case of FIG. 2).

Figure 4:
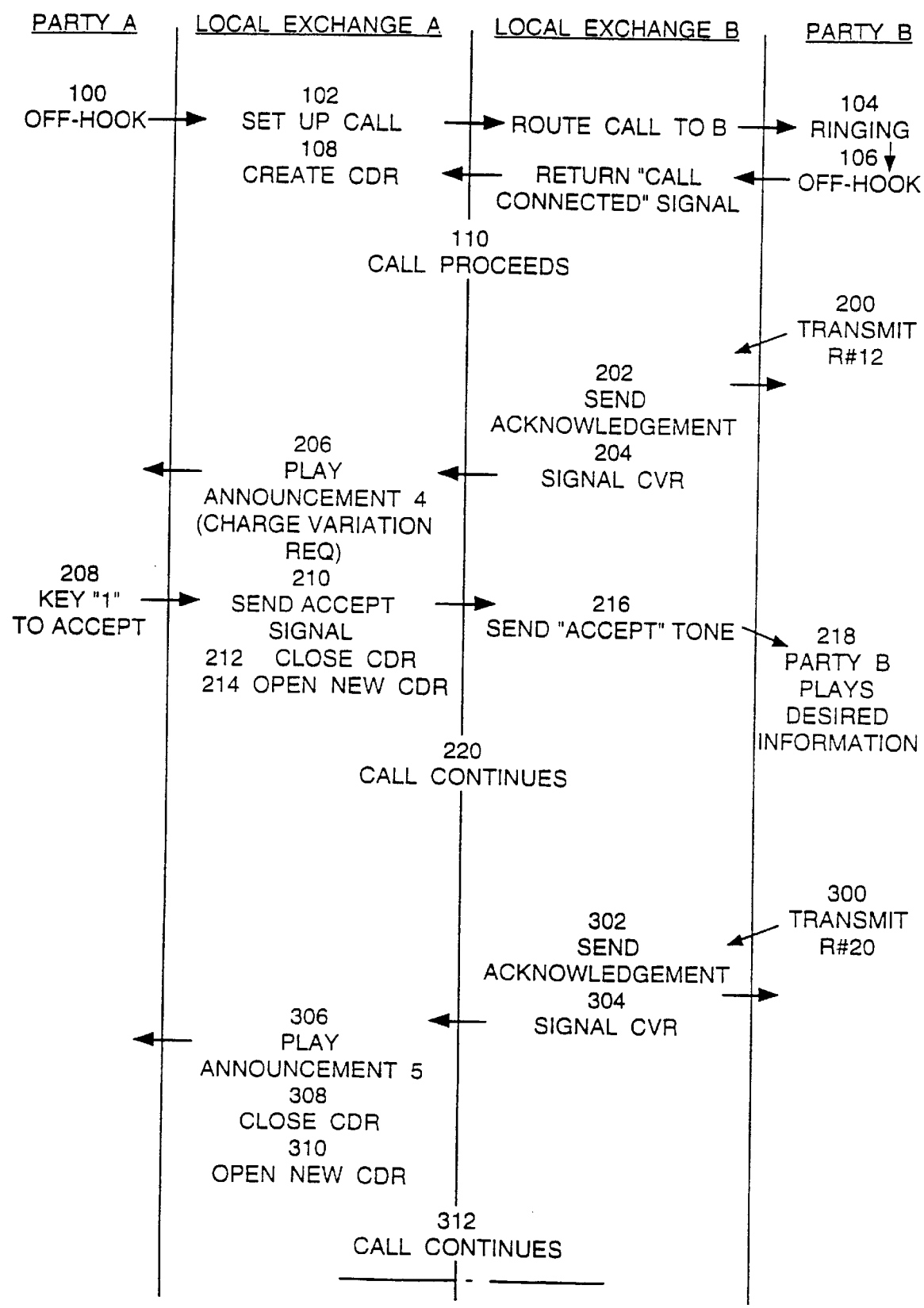

FIG. 4 illustrates the implementation of facility 2, again assuming parties A, B, on different local exchanges. The call (originated by party A) is set up in the usual way (steps 100 to 110). Suppose party B is providing a recorded information service, and that party A is currently in the course of a dialogue with equipment at party B (for example by recorded announcements played at party B and spoken or keypad responses sent by party A and recognised by party B's equipment—the network being transparent as far as this dialogue is concerned). Suppose further that party A has requested a service (for example the latest stock market figures) for which party B makes a charge. Party B's equipment signals (200) a request for a higher rate call charge to be invoked by transmission of a "R#12" signal. It is assumed that the particular charging rate is inherent in this particular code, as also is the fact that the request originates from equipment at party B, other codes being allocated for use by a human operator requesting the same service and for different call rates. Thus exchange B responds by:

Step 202: sending a coded (tone) acknowledgement signal to party B.

Step 204: forwarding a charging rate increase request signal to exchange A.

Exchange A responds to this signal by playing (206) to party A an announcement e.g. "The other party has requested a charging rate of 90 pence per minute. Please key '1' to accept or '2' to decline."

Assume that party A accepts by (208) keying '1'. The corresponding tone signal is received by exchange A which responds by 210: sending an accept signal to exchange B 212: closing the current Call Detail Record by entering the current time and call duration 214: opening a new Call Detail Record with the current time as the start time.

Local exchange B, upon receipt of the accept signal from exchange A, transmits (216) to party B an "Accept" tone, so that party B's equipment can then proceed to play (218) the valuable recorded information. The call continues (220) at the new charge rate, and terminates normally, as previously described.

Probably it will be appropriate to revert to the original charge rate after the information has been sent, so step 300 shows party B's equipment sending a signal "R#20", to be interpreted as "resume original rate". This is acknowledged (302) by exchange B and forwarded (304) to exchange A, which responds by:

306—playing a recorded announcement to party A, e.g. "normal charging resumed".

308—closing the current Call Detail Record

310—opening a new Call Detail Record (copying the charging rate from the earliest record held for that call in the store 13).

The call continues (312). Further charging rate charges may of course be invoked in the same way. Any convenient arrangements for crediting the party (party B in this example) making the additional charge may, be employed, as with existing 'premium rate' services where the called party receives a proportion of the call charge, for example the charge rate codes inserted into the Call Detail Record may be interpreted by the billing centre 8 as an instruction to credit the called party's account with the appropriate sum.

Although not mentioned above, it is envisaged that a party being called upon to authorise a charge rate may decline to accept the change simply by terminating the call.

The above description envisages the creation of two or more Call Detail Records for a single call. This has the advantage of compatibility with existing Call Detail Record formats. It may mean, though, that existing billing centre software will list on a bill the separate sections of a call as if they were separate calls: however this could be avoided by arranging for the billing centre 8 to recognise when a Call Detail Record for a given subscriber line (number) has a start time which is the same as the finish time of another such record - a condition which does not normally occur, since it will take at least a second to clear down a call and dial a new one. Upon such recognition the billing centre may process the two records together as desired. This recognition could be facilitated by including in the Call Detail Record a flag to be set by the CPU 11 to indicate "further CDR follows".

Alternatively a single Call Detail Record could be used, with a variable length format so that it could accommodate multiple entries each with its own start and stop times and charge band indicator.

In either case it is assumed that the remote billing centre 8 accommodates any variation in charging rate according to time of day; however it may be necessary to take such variations into account in generating the announcement at step 206—either by switching between two or more alternative announcements under control of a local clock, or by quoting the different rates in the announcement itself.

In the event that facility 3 is desired (a single charge), then the process would proceed as depicted in FIG. 4 down to step 220 save that step 214 would be replaced by two steps.

(a) Create a complete new Call Detail Record bearing the one-off charge (say, £3)—either as a record with zero call duration and fixed charge of £3 or, if this is more convenient to fit in with existing billing mechanisms, a record with a short call duration, for example of 1 second and a charging rate of £3 per second.

(b) Create a new Call Detail Record for the continuation of the call.

For facility 4 (new charge rate only for a specified period) the procedure would be as in FIG. 4 down to step 220, but exchange A would be programmed to set a timer for the relevant period (different codes at step 200 being used for different periods), and respond on timeout by automatically performing steps 306–310.

The above description assumes that additional call charges are raised because of services (information) being supplied over the telephone (or other) connection in question. However it is not essential that this is so, for example the call may be associated with a related application such as a pay-per-view cable TV offering where a customer dials up the TV service using a telephony cad. The above mechanism could be used to accept the charges for the selected film/programme from the TV service provider, causing the appropriate telephone bill to be debited, even though the actual service which is being paid for is not transmitted over the telephony connection.

Other mechanisms may be applicable, such as use of the Analogue Display Screen Interface for communicating charge variation alerts, requests and acknowledgements. Similarly, other network access arrangements may be used for example ISDN basic/primary rate access, or similar, where the appropriate messages may be transmitted using common channel signalling between the terminal equipment and the network.

Finally it is noted that certain steps referred to above may require appropriate message facilities in digital inter-exchange signalling and will require the allocation of new codes within any existing inter-exchange signalling protocol (e.g. C7).

We claim:

1. A telecommunications exchange including a store (13) for storing records (CDRs) containing information as to the cost of connections control means (11) responsive to a connection being established between a calling party and a called party to create in the store a respective record containing charge information for the connection, and responsive, during the connection of said parties, to receipt of a charge variation request signal from one of said parties, to (a) transmit to whichever of said parties is to bear a proposed charge a signal requiring acknowledgement (b) modify the respective record upon receipt of such an acknowledgement.

2. A telecommunications network including a store (13) for storing records (CDRs) containing information as to the cost of connections control means (11) responsive to a connection being established between a calling party and a called party to create in the store a respective record containing charge information for the connection, and responsive, during the connection of said parties, to receipt of a charge variation request signal from one of said parties, to (a) transmit to whichever of said parties is to bear a proposed charge a signal requiring acknowledgement (b) modify the respective record upon receipt of such an acknowledgement.

3. A telecommunications exchange or network according to claim 1 or claim 2, in which the control means is operable to send, upon receipt of the acknowledgement, a confirmation signal to whichever of said parties the charge variation request signal was received from.

4. A telecommunications exchange or network according to claim 2, including voice announcement means (16) and in which the signal requiring acknowledgement and/or the confirmation signal is a voice signal representing a spoken message.

5. A telecommunications exchange or network according to claim 2, in which the control means is responsive to an assigned charge variation request signal for a charge reversal to modify the respective record such as to replace the identity of whichever of said parties is currently being charged by the identity of the other of said parties.

6. A telecommunications exchange or network according to claim 2, in which the control means is responsive to an assigned charge variation request signal for a charge reversal (a) so to modify the respective record as to cancel the charge to whichever of said parties is currently being charged; and (b) to create a further respective record for the connection, which further respective record contains information to enable the charge for the connection to be borne by the other of said parties.

7. A telecommunications exchange or network according to claim 2, in which the control means is responsive to an assigned charge variation request signal for a charge reversal (a) so to modify the respective record as to delete said respective record from the first store; and (b) to create a further respective record for the connection, which further respective record contains information to enable the charge for the connection to be borne by the other of said parties.

8. A telecommunications exchange or network according to claim 2, in which the control means is responsive to an assigned charge variation request signal for a charge reversal (a) so to modify the respective record as to cease the charge to whichever of said parties is currently being charged; and (b) to create a further respective record for the connection, which further respective record contains information to enable the charge for the subsequent part of the connection to be borne by the other of said parties.

9. A telecommunications exchange according to claim 1 or claim 2, in which the control means is responsive to an assigned request signal for a charge reversal (a) so to modify the respective record that charges to the party currently being charged shall be cancelled, or shall cease (b) to transmit to another exchange participating in the connection a request that that other exchange create said further respective record.

10. A telecommunications network according to claim 1 or claim 2, in which said store is disposed in a first exchange (1a), a corresponding store is disposed in another exchange (1b), which other exchange participates in the connection, and the control means is responsive to an assigned request signal for a charge reversal (a) so to modify the respective record that charges to the party currently being charged shall be cancelled, or shall cease (b) to transmit to said other exchange participating in the connection a request that that other exchange create in said corresponding store said further respective record.

11. A telecommunications exchange or network according to claim 1 or claim 2, in which the control means is operable in response to an assigned request signal for charge rate modification so to modify the respective record that the charging rate for continuation of the call shall be different from that obtaining prior to the receipt of that request signal.

12. A telecommunications exchange or network according to claim 11, in which the control means is operable in response to an assigned request signal for temporary charge rate modification so to modify the respective record that the charging rate for continuation of the call shall for a specified period or for the remainder of the call if shorter be different from that obtaining prior to the receipt of that request signal.

13. A telecommunications exchange or network according to claim or claim 2, in which the control means is operable in response to an assigned request signal for a single charge so to modify the respective record that an additional charge shall be made.

14. A method of operating a telecommunication network including the steps of;

(a) making a connection between a first and a second party;

(b) creating a respective record (CDR) containing information as to the charge to be made for the connection;

(c) receiving, during said connection, a charge variation request signal from one of said parties; and in response (d) transmitting, to whichever of said parties is to be bear a proposed charge, a signal requiring acknowledgement; and (e) modifying said respective record upon receipt of such an acknowledgement.

* * * * *